United States Patent
Hebert

(10) Patent No.: US 6,167,715 B1
(45) Date of Patent: Jan. 2, 2001

(54) DIRECT REFRIGERANT GEOTHERMAL HEAT EXCHANGE OR MULTIPLE SOURCE SUBCOOL/POSTHEAT/PRECOOL SYSTEM THEREFOR

(76) Inventor: Thomas H. Hebert, 1340 Eastwood Dr., Lutz, FL (US) 33612

(*) Notice: Under 35 U.S.C. 154(b), the term of this patent shall be extended for 0 days.

(21) Appl. No.: 09/167,429

(22) Filed: Oct. 6, 1998

(51) Int. Cl.[7] .................................................. F25D 23/12
(52) U.S. Cl. .............................. 62/260; 62/324.6; 165/46
(58) Field of Search .................. 62/260, 324.6; 165/46

(56) References Cited

U.S. PATENT DOCUMENTS

| | | | | |
|---|---|---|---|---|
| 5,383,337 | * | 1/1995 | Baker | 62/260 |
| 5,394,935 | * | 3/1995 | Glover | 62/260 |
| 5,477,914 | * | 12/1995 | Rawlings | 62/260 |
| 5,560,220 | * | 10/1996 | Cochran | 62/260 |
| 5,584,190 | * | 12/1996 | Cole | 62/260 |
| 5,671,608 | * | 9/1997 | Wiggs et al. | 62/260 |
| 5,706,888 | * | 1/1998 | Ambs et al. | 165/155 |
| 5,806,331 | * | 9/1998 | Brown | 62/260 |
| 5,852,939 | * | 12/1998 | Gazes | 62/260 |
| 5,937,665 | * | 8/1999 | Kiessel et al. | 62/260 |

* cited by examiner

Primary Examiner—William Doerrler
Assistant Examiner—Mark Shulman
(74) Attorney, Agent, or Firm—Holland & Knight

(57) ABSTRACT

First, a system for providing liquid refrigerant subcooling, subsequent to that subcooling accomplished by the primary condenser, by means of direct geothermal heat exchange and if required, secondary (or more) fluid(s) supplementary cooling of the liquid refrigerant contiguous with the direct geothermal subcooling. This system could be utilized with standard condensers for higher efficiency air conditioning, heat pump in the cooling mode, or refrigeration operation of any kind. No modifications to the actual condenser would be required, but a larger evaporator surface could be required.

Secondly, a system for providing supplemental heat to the primary evaporator of a heat pump operating in the heating mode, by means of a direct geothermal heat exchange, coupled with heat reclaim of the liquid refrigerant, and if necessary with secondary (or more) fluid(s). This system would require some modification of a standard heat pump in addition to the installation of the direct geothermal liquid refrigerant reclaim, secondary (or more) fluid heat postheater. Next, a system that would provide liquid refrigerant subcooling by means of direct geothermal heat exchange and if required, secondary (or more) fluid(s) supplementary subcooling, coupled with a system that would provide direct geothermal, plus a possible secondary (or more) fluid, supplementary heat, to a postheater of a heat pump in the heating mode. That said postheater becoming a precooler of the hot gas refrigerant when the heat pump is in the cooling mode. Finally, a system that would provide liquid refrigerant subcooling by means of direct geothermal heat exchange and if required, a secondary (or more) fluid(s) supplementary subcooling coupled with a system that would provide direct geothermal heat exchange precooling of the hot gas refrigerant and if required, a secondary (or more) fluid(s) precooling of the hot gas refrigerant. This system could be utilized with standard air source or water source air conditioning or refrigeration condensers for producing more capacity and higher efficiency.

5 Claims, 11 Drawing Sheets

Tube on Tube

Straight

Twisted

Tube in Tube

Straight

Twisted / Deformed

DIRECT REFRIGERANT GEOTHERMAL HEAT EXCHANGE OR MULTIPLE SOURCE SUBCOOL/POSTHEAT/PRECOOL SYSTEM THEREFOR

BACKGROUND OF THE INVENTION

1. Field of the Invention

The present invention relates to a direct refrigerant geothermal heat exchange subcool system for the liquid refrigerant and if required, a secondary (or more) fluid(s) supplementary refrigerant subcool system coupled with a conventional air source or water source refrigerant condenser of increased refrigerant capacity for use with any air conditioner, heat pump in the cooling mode or refrigeration system. The present invention also relates to a direct refrigerant geothermal subcool/postheat heat exchange system and if required, a secondary (or more) fluid(s) supplementary refrigerant subcool/postheat system which has a liquid to suction line heat exchange subcool/postheat system that couples with a heat pump air source or water source evaporator (heat pump in the heating mode) of increased refrigeration capacity for use with any heat pump system.

The present invention further relates to a direct refrigerant geothermal heat exchange postheat, precool system and if required, a secondary (or more) fluid(s) supplementary postheat, precool system that precools or postheats the refrigerant between the reversing valve and outdoor coil of an air source heat pump or the water source coil of a water source heat pump, for providing increased capacity and efficiency to said heat pump both in the heating and cooling mode.

Finally, the present invention relates to a direct refrigerant geothermal heat exchange precool system and if required, a secondary (or more) fluid(s) supplementary precool system that precools the hot gas refrigerant before the condenser of an air conditioner or refrigeration system, for providing increased capacity and efficiency to said air conditioning or refrigeration system.

This invention more particularly pertains to an apparatus and method comprising a geothermal and if necessary, a secondary (or more) fluid(s) cooled subcooler positioned between a conventional air source or water source condenser and the evaporator. This invention also more particularly pertains to an apparatus and method comprising a geothermal postheater (suction line heat source) coupled with a liquid line to suction line heat reclaim heat exchanger and if necessary, a secondary (or more) fluid(s) heat exchanger positioned so that the liquid line coming from the indoor condenser of a heat pump is in direct heat exchange contact with the suction line coming off of the outdoor air source or water source evaporator before the reversing valve of a heat pump in the heating mode and said heat exchanger is also in direct contact with the ground for direct geothermal heat exchange and if necessary, a secondary (or more) fluid(s) heat exchanger.

Further, this invention more particularly pertains to an apparatus and method comprising a geothermal and if required, secondary (or more) fluid(s) postheater, precooler, positioned between the reversing valve and outdoor coil of an air source heat pump or the water source coil of a water source heat pump so that the refrigerant flowing through the heat exchanger has heat added to it in the heating mode of a heat pump and has heat removed from it in the cooling mode of said heat pump, by said heat exchanger being in direct contact with the ground for direct geothermal heat exchange and if necessary in contact with a secondary (or more) fluid(s) heat exchanger.

Finally, this invention also more particularly pertains to an apparatus and method comprising a geothermal and if necessary, a secondary (or more) fluid(s) cooled precooler positioned between a conventional air source or water source condenser and the discharge of the compressor of an air conditioning, heat pump in the cooling mode, or refrigeration system so that when refrigerant flows through the heat exchanger, heat energy is removed from it.

2. Description of the Background Art

Presently there exist many types of devices designed to operate in the thermal transfer cycle. The vapor-compression refrigeration cycle is the pattern cycle for the great majority of commercially available refrigeration systems. This thermal transfer cycle is customarily accomplished by a compressor, condenser, throttling device and evaporator connected in serial fluid communication with one another. The system is charged with refrigerant, which circulates through each of the components. More particularly, the refrigerant of the system circulates through each of the components to remove heat from the evaporator and transfer heat to the condenser. The compressor compresses the refrigerant from a low-pressure superheated vapor state to a high-pressure superheated vapor state thereby increasing the temperature, enthalpy and pressure of the refrigerant. A superheated vapor is a vapor that has been heated above its boiling point temperature. It leaves the compressor and enters the condenser as a vapor at some elevated pressure where the refrigerant is condensed as a result of the heat transfer to cooling water and/or to ambient air. The refrigerant then flows through the condenser condensing the refrigerant at a substantially constant pressure to a saturated-liquid state. The refrigerant then leaves the condenser as a high pressure liquid. The pressure of the liquid is decreased as it flows through the expansion valve causing the refrigerant to change to a mixed liquid-vapor state. The remaining liquid, now at low pressure, is vaporized in the evaporator as a result of heat transfer from the refrigerated space. This vapor then enters the compressor to complete the cycle. The ideal cycle and hardware schematic for vapor compression refrigeration is shown in FIG. 1 as cycle 1-2-3-4-1. More particularly, the process representation in FIG. 1 is represented by a pressure-enthalpy diagram, which illustrates the particular thermodynamic characteristics of a typical refrigerant. The P-h plane is particularly useful in showing the amounts of energy transfer as heat. Referring to FIG. 1, saturated vapor at low pressure enters the compressor and undergoes a reversible adiabatic compression, 1-2. Adiabatic refers to any change in which there is no gain or loss of heat. Heat is then rejected at constant pressure in process 2-3. An adiabatic pressure change occurs through the expansion device in process 3-4, and the working fluid is then evaporated at constant pressure, process 4-1, to complete the cycle. However, the actual refrigeration cycle may deviate from the ideal cycle primarily because of pressure drops associated with fluid flow and heat transfer to or from the surroundings. It is readily apparent that the temperature of the liquid refrigerant plays an important role in the potential for removing heat in the evaporator phase of the thermal cycle. The colder the liquid refrigerant entering the evaporator, the greater the possible change in enthalpy or heat energy absorbed per unit mass of liquid available for vaporization and the colder the liquid refrigerant entering the expansion device leading to the evaporator, the lower the flash gas loss, which means a higher portion or percentage of mass is available for vaporization through the evaporator. It is also readily apparent that the amount of heat available to the evaporator plays an important role in the amount of heat available for discharge from the condenser of a heat pump in the heating mode. Finally, it is readily apparent that rapid precooling of the hot gas discharge from a compressor lowers power consumption, improves compressor efficiency and improves the primary condenser's performance. Many such devices and methods currently exist that are designed to accomplish this subcooling, postheating and precooling.

However, these known methods and devices have drawbacks. The drawbacks include high cost of accomplishing the subcooling, postheating, and/or precooling, and/or the ineffectiveness or degrading effectiveness of the subcooling, postheating, and/or precooling, postheating and/or precooling method and/or device.

In response to the realized inadequacies of earlier methods and devices, it became clear that there is a need for a liquid refrigerant subcooler that has a low initial cost as well as having a method and device that will maintain optimum subcooling under varying primary condenser conditions. It is also readily apparent that the amount of heat available to the refrigerant in the evaporator plays an important role in providing heat for discharge in the condenser of a heat pump in the heating mode. As stated previously, subcooling improves the efficiency of the evaporator. By coupling the liquid line to the suction line after the primary evaporator, a more efficient removal of heat by the primary evaporator is coupled to a heat reclaim by the suction line to liquid line heat exchange. By combining these into a direct burial geothermal heat exchanger, even more heat becomes available for the vaporization portion of the cycle. In the cooling mode the heat exchanger between the liquid line and the line between the reversing valve and outdoor coil of a heat pump is bypassed.

This postheating/subcooling process can be combined with the improved direct geothermal and if necessary secondary (or more) fluid(s) heat exchange previously described for use with heat pumps in the heating or cooling modes.

It is also clear that rapid precooling of the hot gas discharge from a compressor reduces head pressure, decreases power consumption and improves the efficiency of the primary condenser of an air conditioner, heat pump in the cooling mode or a refrigeration system.

For a heat pump, where direct burial geothermal and if necessary, secondary (or more) fluid(s) heat exchange can be established for the refrigerant flowing between the reversing valve and the outdoor (or water source) coil, more heat becomes available for the vaporization portion of the refrigeration cycle when in the heating mode and if not bypassing this heat exchanger in the cooling mode, rapid precooling of the hot gas discharge can be accomplished.

For an air conditioner or refrigeration system, where direct buried geothermal and if necessary, secondary (or more) fluid(s) heat exchange can be established for the refrigerant flowing between the compressor and the condenser, rapid precooling of the hot gas discharge can be accomplished.

Therefore the principle objective of this invention is to provide an improvement which overcomes the aforementioned inadequacies of the prior art devices and provides an improvement which is a significant contribution to the advancement of the subcooler, postheater and precooler art.

Another objective of the present invention is to provide a more constant subcooling over a wide range of air source conditions.

Still another objective of the present invention is to provide geothermal cooling to the liquid refrigerant of air conditioning, heat pump (cooling mode) or refrigeration equipment.

Yet another objective of the present invention is to provide a secondary (or more) fluid(s) source subcooling in addition to the geothermal subcooling at time of high heat loads or high outdoor ambient air conditions.

An additional objective of the present invention is to provide increased refrigeration capacity by means of the subcooling of the liquid refrigerant.

Still a further objective of the present invention is to provide reclaim of liquid refrigerant heat in the heating mode of a heat pump.

Yet a further objective of the present invention is to provide additional heat from the liquid refrigerant to the evaporator of a heat pump in the heating mode.

Even yet another objective of the present invention is to provide additional heat to the evaporator from a geothermal source by direct geothermal heat exchange between the suction line and the ground when a heat pump is in the heating mode.

And yet another objective of the present invention is to provide a secondary (or more) fluid(s) source of additional heat to the evaporating refrigerant when a heat pump is in the heating mode.

Still another objective of the present invention is to increase the heat output of a heat pump in the heating mode thereby improving its efficiency.

Still yet another objective of the present invention is to provide rapid precooling of the hot gas discharge from a compressor.

And yet another objective is to provide geothermal cooling to the hot gas discharge from a compressor of an air conditioning, heat pump in the cooling mode, or refrigeration unit.

And yet a further objective of the present invention is to provide a secondary (or more) fluid source precooling of the hot gas discharge in addition to the geothermal precooling, at times of high heat loads or high outdoor ambient conditions.

And still another objective of the present invention is to provide lower power consumption and increased pumping efficiency of the compressor, as well as to improve the primary condenser's performance.

The foregoing has outlined some of the pertinent objects of the invention. These objects should be construed to be merely illustrations of some of the more prominent features and applications of the intended invention. Many other beneficial results can be obtained by applying the disclosed invention in a different manner or by modifying the invention within the scope of the disclosure.

Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. The present invention is directed to a first apparatus that satisfies the need for increased refrigeration effect by means of increased liquid refrigerant subcooling accomplished by direct geothermal heat exchange and/or by fluid to refrigerant heat exchange. For the purpose of summarizing this first apparatus and means of the invention, the combination direct geothermal heat exchange and fluid to refrigerant heat exchange comprises two copper (or other metal) tubes bonded together (by soldering or other method) one tube to carry refrigerant, the other tube a heat exchange fluid (water or other). The liquid refrigerant tube being serially connected between the condenser and the evaporator while buried in the ground for direct geothermal heat exchange. The second tube being serially connected between a source of ground source temperature or colder fluid and a point of discharge, or for recirculation through some temperature modifying medium. If sufficient geothermal source subcooling is available, the secondary fluid tube would not be required.

Simply, this first apparatus allows a direct geothermal heat exchange cooling of the liquid refrigerant line while providing for additional subcooling from a secondary source when the load exceeds the grounds ability to absorb it. The secondary tube could also be used to keep the ground from thermal saturation by providing a secondary heat dissipation method. Where sufficient geothermal heat exchange is available, the secondary tube would not be required.

Moreover, this present invention may be configured by means of a second apparatus, in such a way that for a heat pump operating in the heating mode a portion or all of the direct geothermal heat exchange length has a 2nd (and $3^{rd}$ if a secondary fluid is required) tube fused (soldered or other) to the liquid line that is serially connected between the outdoor coil and the reversing valve by means of check valves (or solenoid valves or other) in such a way that there is flow through the geothermal section only when the heat pump is operating in the heating mode.

Simply, this second apparatus allows a direct geothermal heat exchange while also allowing liquid line heat reclaim and subcooling, thereby providing for increased evaporator efficiency and increased heating efficiency and capacity of the heat pump in the heating mode.

Additionally, this present invention may be configured by means of an alternate second apparatus, which could be utilized with the first apparatus described. The alternate second apparatus configured in such a way that for a heat pump, the line between the reversing valve and outdoor (or water source) coil of an air source (or water source) heat pump is serially connected through a direct geothermal heat exchanger, which if required is fused (by soldering or other means) to a secondary (or more) fluid(s) heat exchanger.

Simply, this alternate second apparatus provides extra heat (postheating) to the vaporizing refrigerant, from a geothermal source, and if required from a secondary (or more) fluid(s) source, when the heat pump is in the heating mode, and rapidly precooling the hot gas refrigerant by means of the geothermal source, and if required by the secondary (or more) fluid(s) source, when the heat pump is in the cooling mode.

Finally, this present invention may be configured by means of a third apparatus in such a way that for an air conditioner or refrigeration system, the line between the compressor discharge and the condenser is serially connected through a direct geothermal heat exchanger, which if required is fused (soldered or by other means) to a secondary (or more) fluid(s) heat exchanger.

Simply, this third apparatus allows a direct geothermal heat exchange and if required, a secondary (or more) fluid(s) rapid cooling of the hot gas discharge from a compressor, before the gas enters the condenser.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
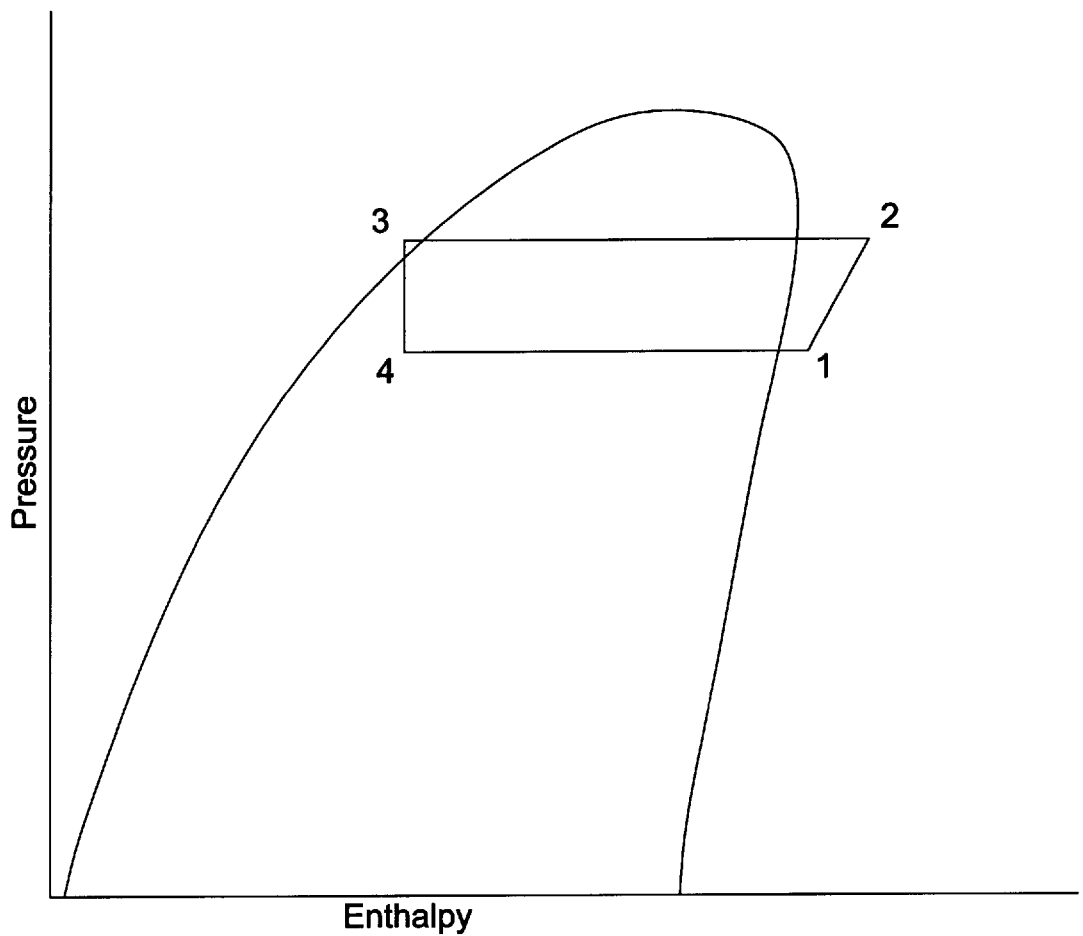
FIG. 1 is a representation of the refrigeration process on a pressure enthalpy diagram.
Figure 2:
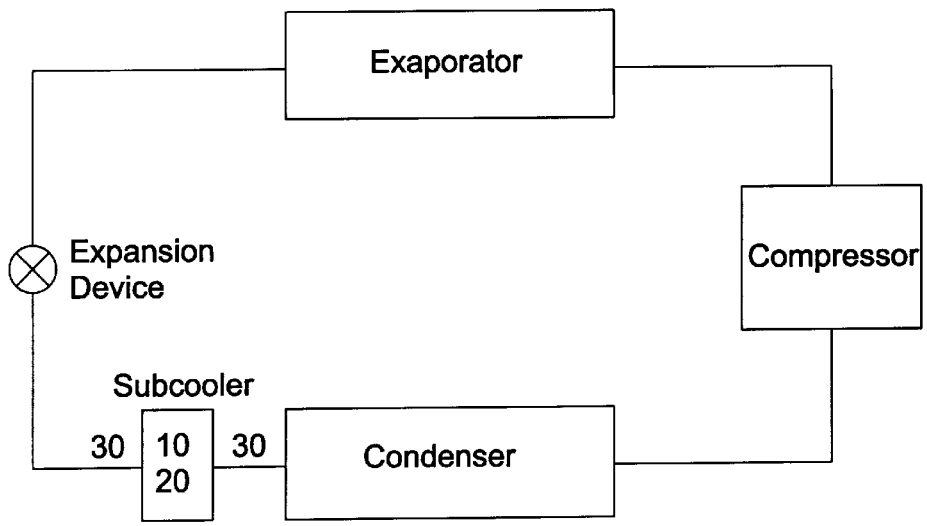
FIG. 2 is a hardware schematic of the vapor compression cycle for a straight cool air conditioner or refrigeration system showing the location of the direct geothermal heat exchange/plus secondary fluid heat exchange subcooler. (No secondary fluid heat exchanger is required where geothermal heat exchange is adequate.)
Figure 2A:
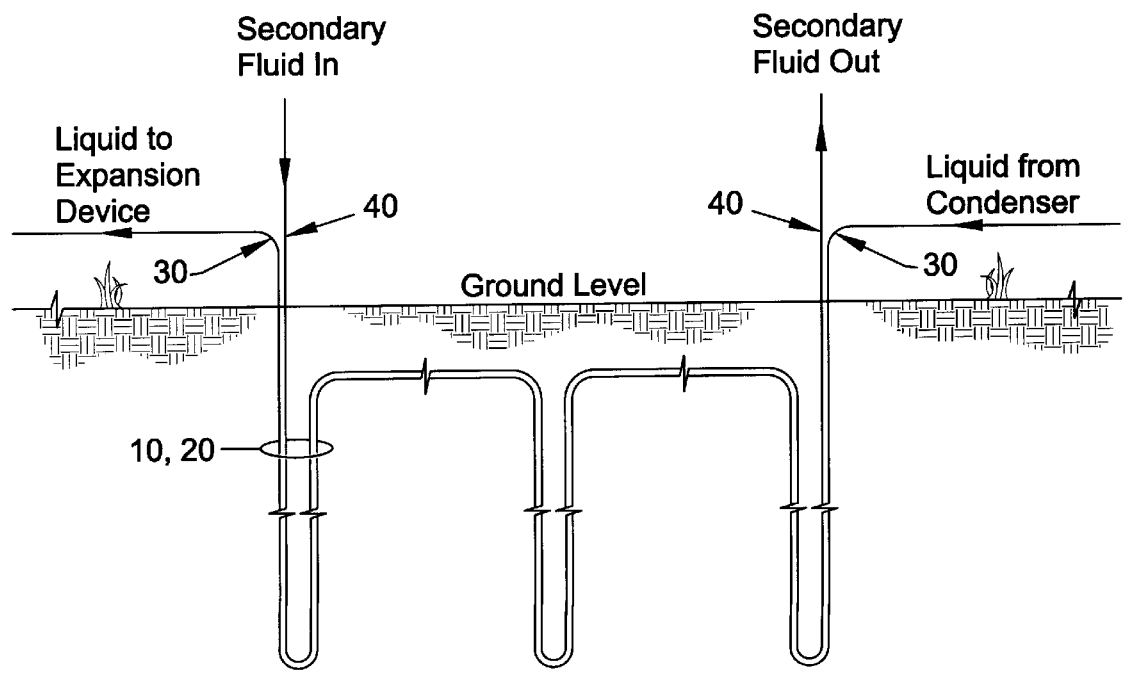
FIG. 2a is a perspective cut away view showing the relationships, of the direct geothermal heat exchange plus secondary fluid heat exchange subcooler, to the ground level.
Figure 2B:
FIG. 2b is a section view of the direct geothermal heat exchanger plus secondary fluid heat exchange where used as a subcooler, precool/postheater or precooler, showing the relationship of the components.
Figure 2C:
FIGS. 2c, 2d, 2e, 2f and 2g are perspective views of some of the possible tubing configurations of the direct geothermal heat exchanger plus secondary fluid heat exchanger.
Figure 2D:
Figure 2E:
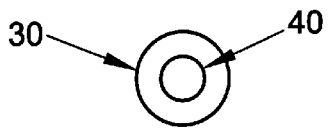
Figure 2F:
Figure 2G:
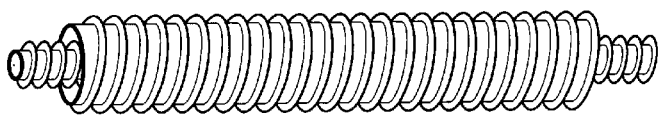

With reference to the drawings, and in particular to FIGS. 2, 2a, 2b, 3, 3a, 3b, 4, 4a, 5 and 5a thereof, new and improved subcooling, subcooling/postheating, precooling/postheating and/or precooling devices for improved refrigeration capacity embodying the principles and concepts of the present invention and generally designated by the reference number (10) for the subcooler only, generally designated by the reference number (11) for the subcooler postheater combination, generally designated by the reference number (12) for the precooler/postheater combination and generally designated by the reference number (14) for the precooler only will be described. First for the subcooler system only (10), of the present invention, as illustrated in FIGS. 2, 2a and 2b, a subcooler for the liquid refrigerant relies on one or two (or more) heat sink sources; a geothermal coupling with the ground (20) and a secondary fluid coupling by means of a thermal coupling between the tube carrying the refrigerant (30) and the tube carrying the secondary fluid (40). The multiple source subcooler is to be connected in serial communication in the refrigeration cycle as shown in FIG. 2. This embodiment of the present invention may have various configurations, comprising of a variety of heat exchanger types (FIGS. 2c, 2d, 2e and 2f) and the secondary fluid may comprise any one of a number of possible sources (FIGS. 4, 4a) to include well water, recirculated water, water supply to a hot water heater, secondary cooled fluids such as antifreezes, oils or other liquids or fluids such as gases. The secondary fluid could run through the heat exchanger common flow or counterflow to the liquid refrigerant flow direction. The secondary fluid could run continuously, intermittently without respect to refrigerant flow, intermittently with respect to refrigerant flow, intermittently with respect to some control requirement, or not be used at all. More than one secondary fluid could also be used by adding additional tubes. (This applies to all other forms of the present invention).

Figure 3:
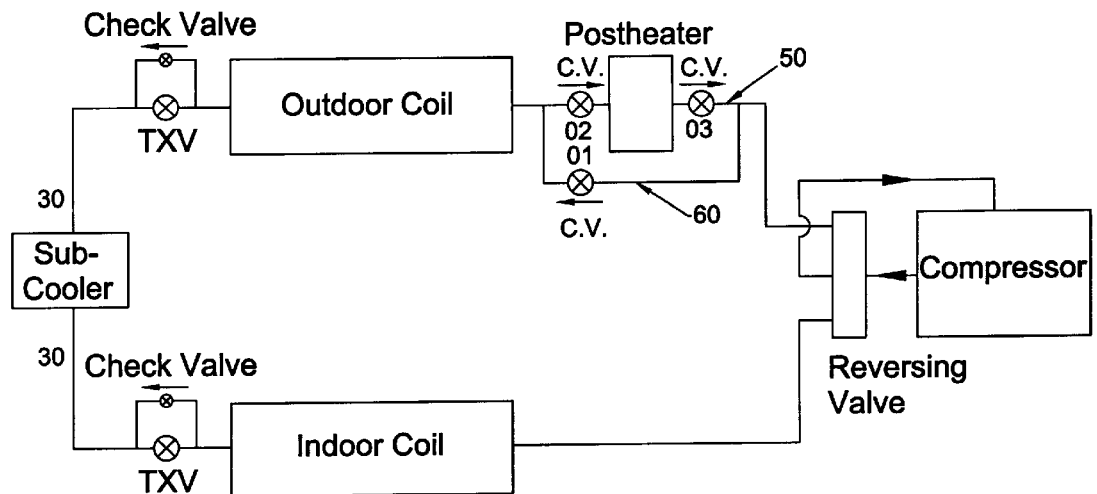
FIG. 3 is a hardware schematic of the vapor compression cycle for a heat pump system showing the location of the direct geothermal heat exchange plus liquid refrigerant heat reclaim postheater coupled with secondary (or more) fluid(s) heat exchange operating in the heating mode, as well as the valving required to bypass the postheater in the cooling mode.
Figure 3A:
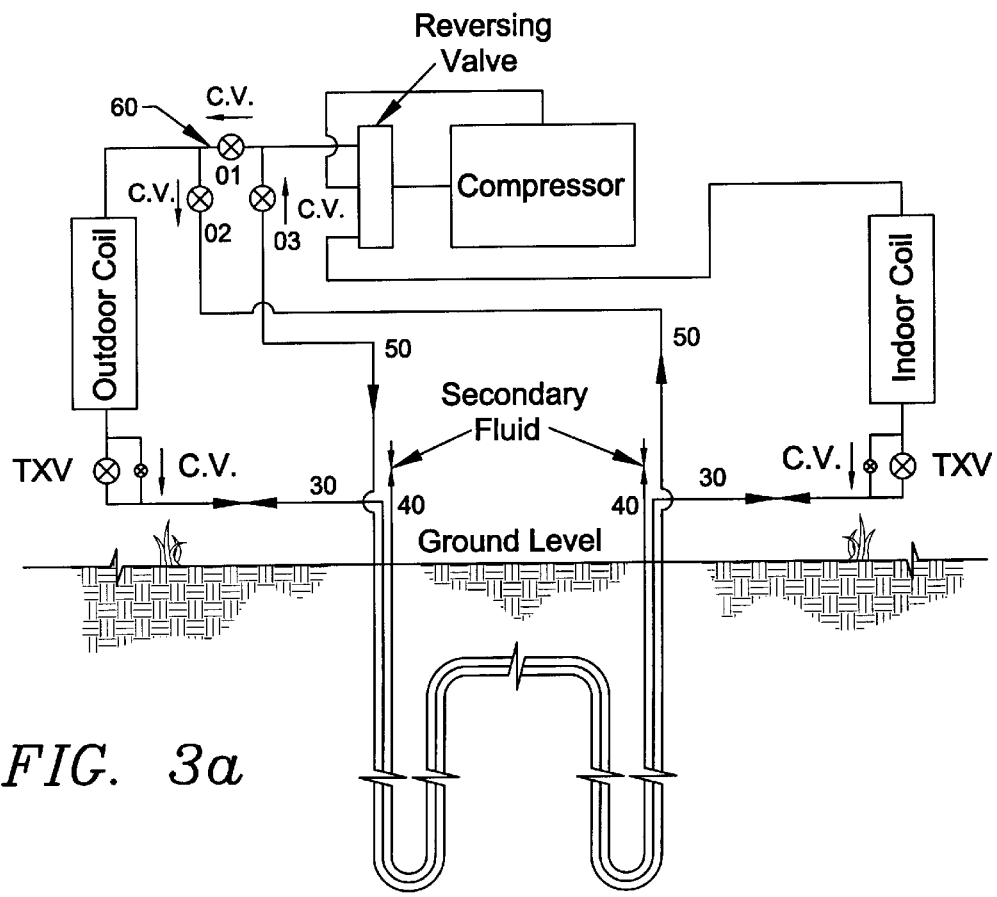
FIG. 3a is a perspective cut-away view showing the relationships, of the direct geothermal heat exchange plus liquid refrigerant heat reclaim postheater coupled with secondary fluid heat exchange system, to the ground level.
Figure 3B:
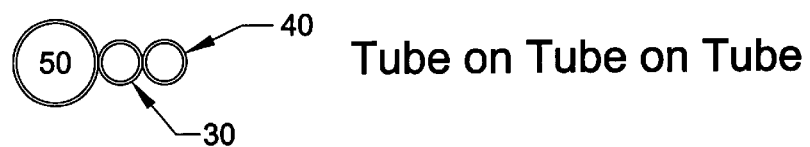
FIG. 3b is a sectional view of the direct geothermal heat exchange plus liquid refrigerant heat reclaim postheater coupled with secondary (or more) fluid(s) heat exchange showing the relationship of the various components.

For the subcooler postheater (11) combination, of the present invention, as illustrated in FIGS. 3, 3a and 3b, for a heat pump operated in the cooling mode, the subcooler operates the same way as previously described. For the subcooler postheater (11), of the present invention as illustrated in FIGS. 3, 3a and 3b for a heat pump operated in the heating mode, the postheater portion relies on up to three (or more) heat supply sources; a geothermal coupling with the ground (20), a thermal coupling with the liquid refrigerant line (30), and a possible thermal coupling with a secondary (or more) fluid(s) (40). The multiple source postheater/subcooler is to be connected in serial communication in the refrigeration cycle as shown in FIG. 3. FIG. 3a more clearly illustrates the relationship of the multiple source subcooler/postheater with regard to the required geothermal coupling (20). The coupling could occur utilizing relatively shallow horizontal ditches, and/or shallow (or deep) well holes for providing mass and surface area for geothermal exchange. FIG. 3a also illustrates the refrigerant piping and valving arrangement required that would allow the return gas (suction) to pass through the subcooler/postheater geothermal heat exchanger in the heating mode, while preventing the discharge gas (hot gas) from passing through the subcooler/postheater geothermal heat exchanger in the cooling mode. In FIG. 3a, valves (01), (02) and (03) accomplish this. These valves could be check valves (direction of flow allowed shown by arrows) solenoid valves; or other.

FIGS. 2c, 2d, 2e, and 2f are illustrative of some of the forms of heat exchange methods possible between the liquid refrigerant (30) and the secondary fluid (40), the suction line gas (50) and the secondary fluid (40), or the hot gas refrigerant (60) and the secondary fluid (40).

Figure 3C:
FIGS. 3c, 3d and 3e are perspective views of some of the possible tubing configurations of the direct geothermal heat exchanger plus liquid refrigerant heat reclaim postheater coupled with secondary (or more) fluid(s) heat exchange system.
Figure 3D:
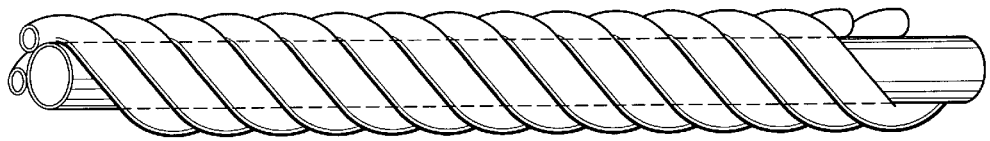
Figure 3E:
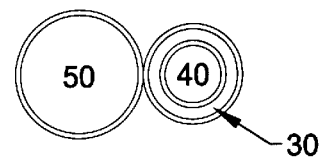

FIGS. 3c, 3d and 3e are illustrative of some of the forms of heat exchange methods possible between the liquid refrigerant (30), return gas (suction)(50) and the secondary fluid (40).

Figure 4:
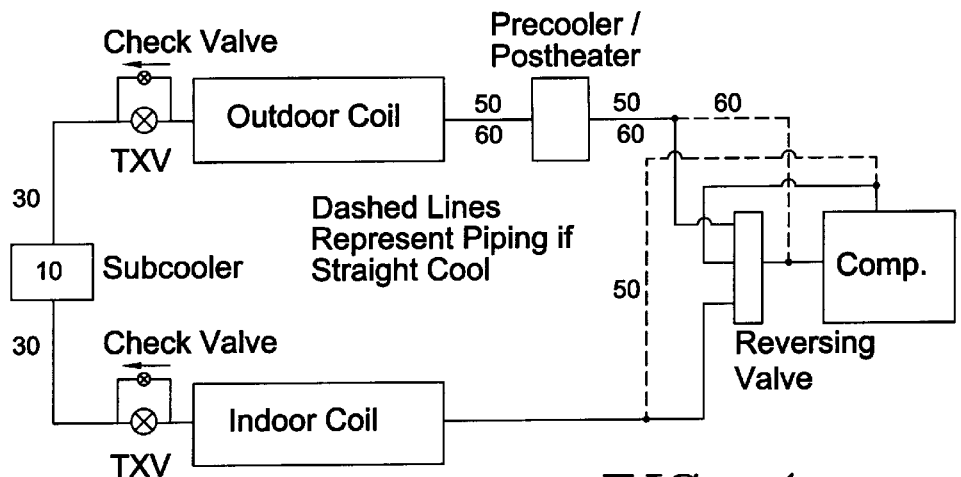
FIG. 4 is a hardware schematic of the vapor compression cycle for a heat pump system showing the location of the direct geothermal and (if necessary) secondary (or more) fluid(s) precooler/postheater heat exchange system utilized along with the direct geothermal and (if necessary) secondary (or more) fluid(s) subcooler of FIGS. 2, 2a, and 2b.
Figure 4A:
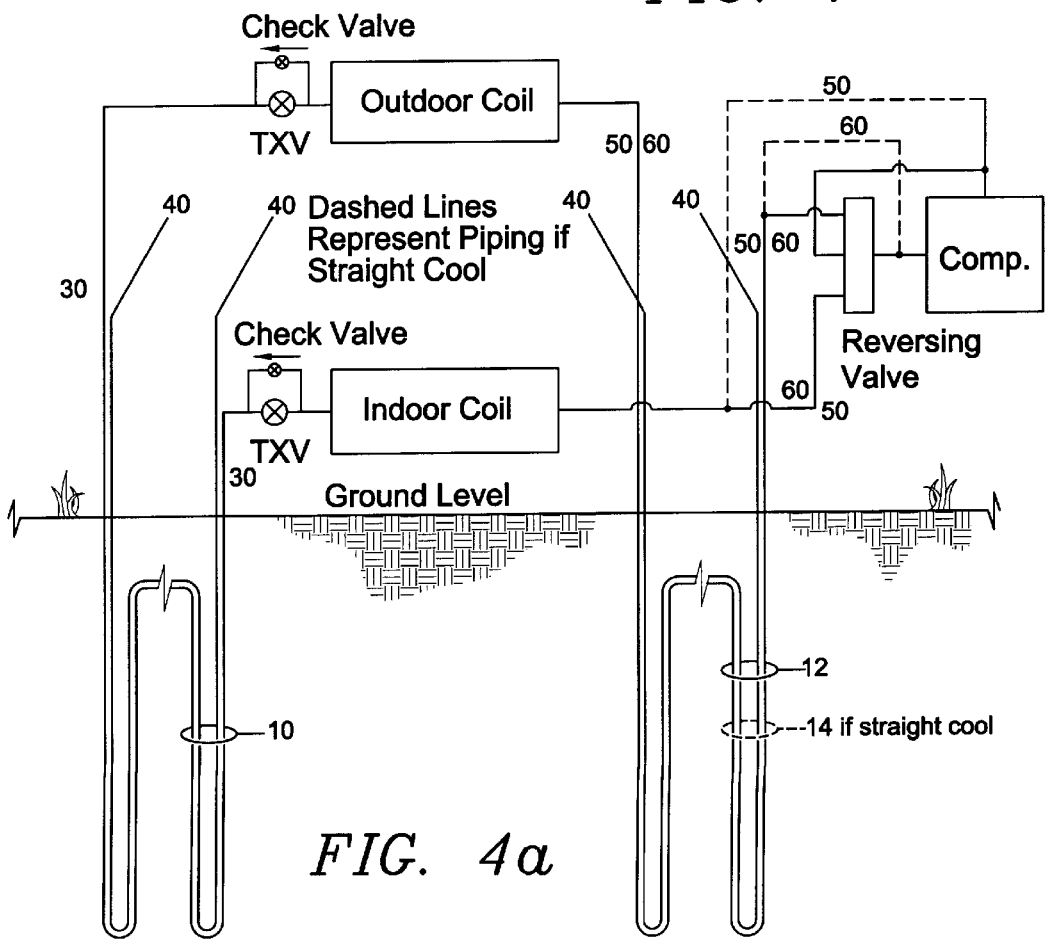
FIG. 4a is a perspective cut-away view showing the relationships of the direct geothermal and (if necessary) secondary (or more) fluid(s) precooler/postheater heat exchange system utilized along with the direct geothermal and (if necessary) secondary (or more) fluid(s) subcooler and their relationships to ground level.

For the precooler/postheater (12) combination, of the present invention, as illustrated in FIGS. 4, and 4a, for a heat pump operating in the heating mode, the precooler/postheater operates as a postheater to the vaporizing refrigerant and relies on up to two (or more) heat supply sources; a geothermal coupling with the ground (20), and a possible thermal coupling with a secondary (or more) fluid(s) (40). When in the cooling mode, the precooler/postheater operates as a precooler of the hot gas refrigerant (60) as it passes from the compressor to the condenser and relies on up to two (or more) heat sink sources to dissipate heat into; a geothermal coupling with the ground (20), and a possible thermal coupling with a secondary (or more) fluid(s) (40). The multiple source precooler/postheater is to be connected in serial communication in the refrigeration cycle as shown in FIG. 4. FIG. 4a more clearly illustrates the relationship of the multiple source precooler/postheater with regard to the required geothermal coupling (20). The coupling could occur utilizing relatively shallow horizontal ditches and/or shallow (or deep) well holes for providing mass and area for geothermal exchange.

Figure 5:
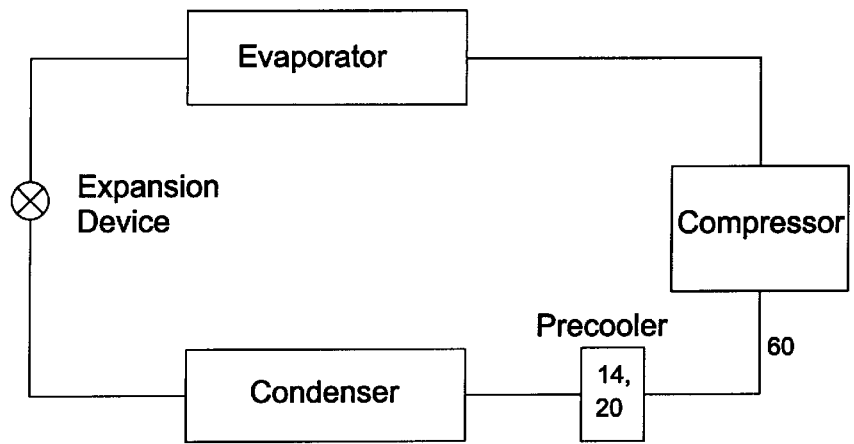
FIG. 5 is a hardware schematic of the vapor compression cycle for an air conditioner or refrigeration system showing the location of the direct geothermal and (if necessary) secondary (or more) fluid(s) precooler heat exchange system utilized along with the direct geothermal and (if necessary) secondary (or more) fluid(s) subcooler of FIGS. 2, 2a, and 2b.
Figure 5A:
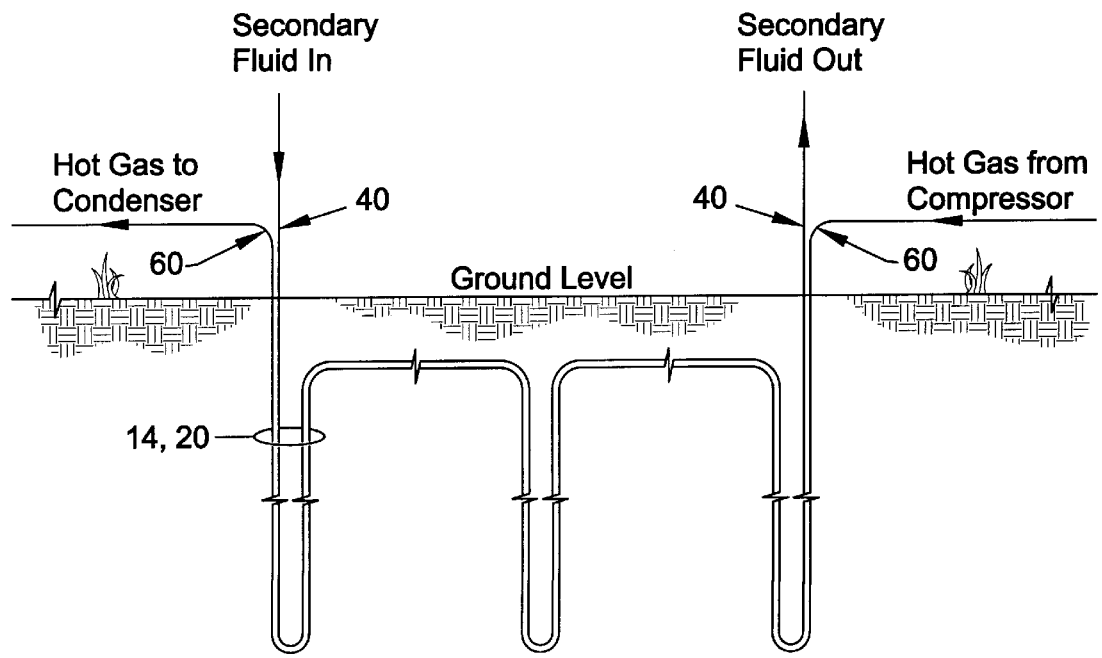
FIG. 5a is a perspective cut-away view showing the relationships of the direct geothermal and (if necessary) secondary (or more) fluid(s) precooler heat exchange system utilized along with the direct geothermal and (if necessary) secondary (or more) fluid(s) subcooler and their relationships to ground.

For the precooler system only (14), of the present invention, as illustrated in FIGS. 5 and 5a, a precooler for the hot gas refrigerant (60) relies on up to two (or more) heat sink sources; a geothermal coupling with the ground (20) and a possible thermal coupling with a secondary (or more) fluid(s) (40). The multiple source precooler is to be connected in serial communication in the refrigeration cycle as shown in FIG. 5. FIG. 5a more clearly illustrates the relationship of the multiple source precooler with regard to the required geothermal coupling (20). The coupling could occur using relatively shallow horizontal ditches and/or shallow (or deep) well holes for providing mass and area for geothermal heat exchange.

Figure 6:
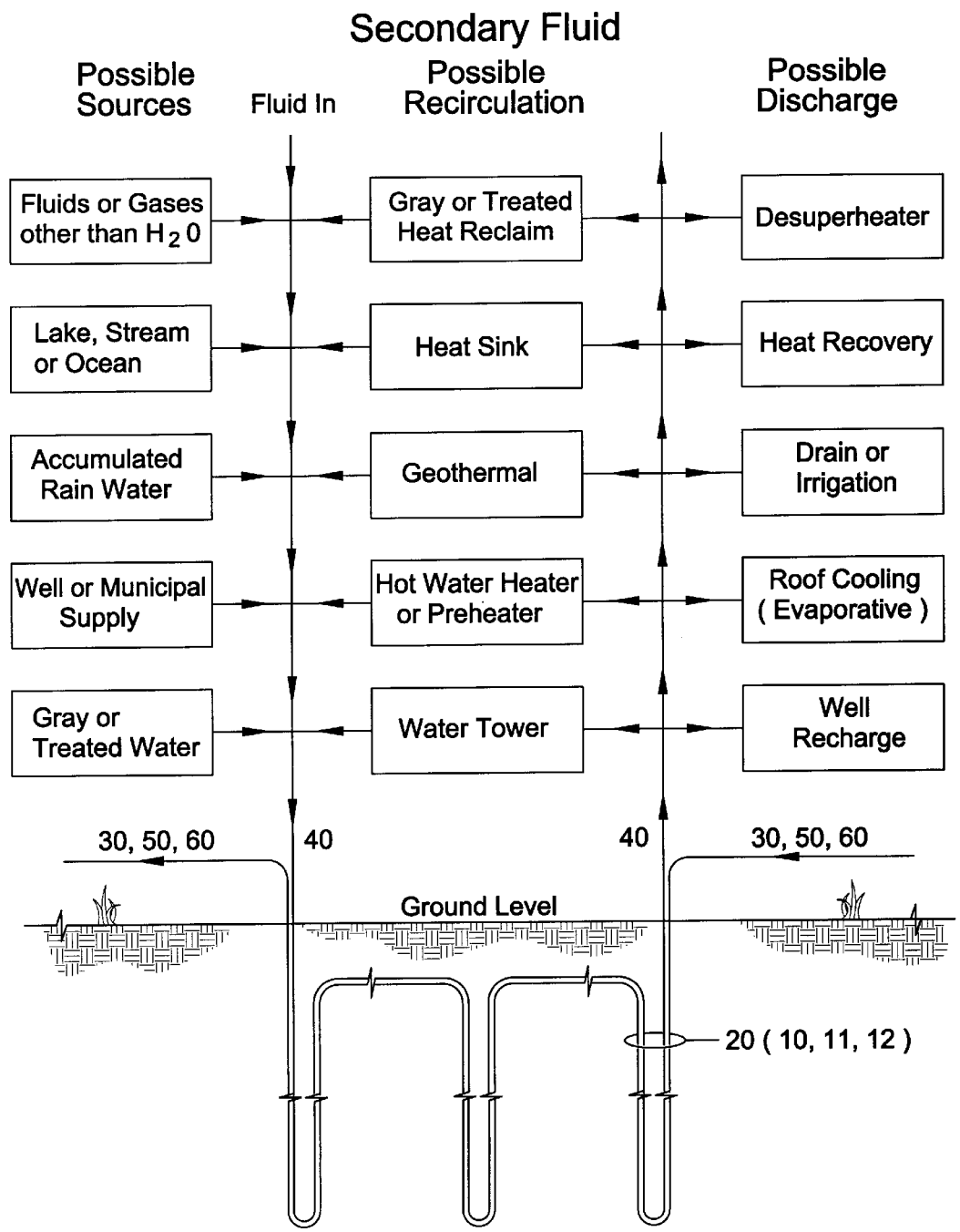
FIG. 6 illustrates some of the possible sources of the secondary fluid and some of the uses and/or discharge possibilities for the spent secondary fluid.

FIG. 6 is illustrative of some of the possible sources for the secondary fluid and some of the possible uses and/or discharge possibilities of the spent secondary fluid.

Figure 7:
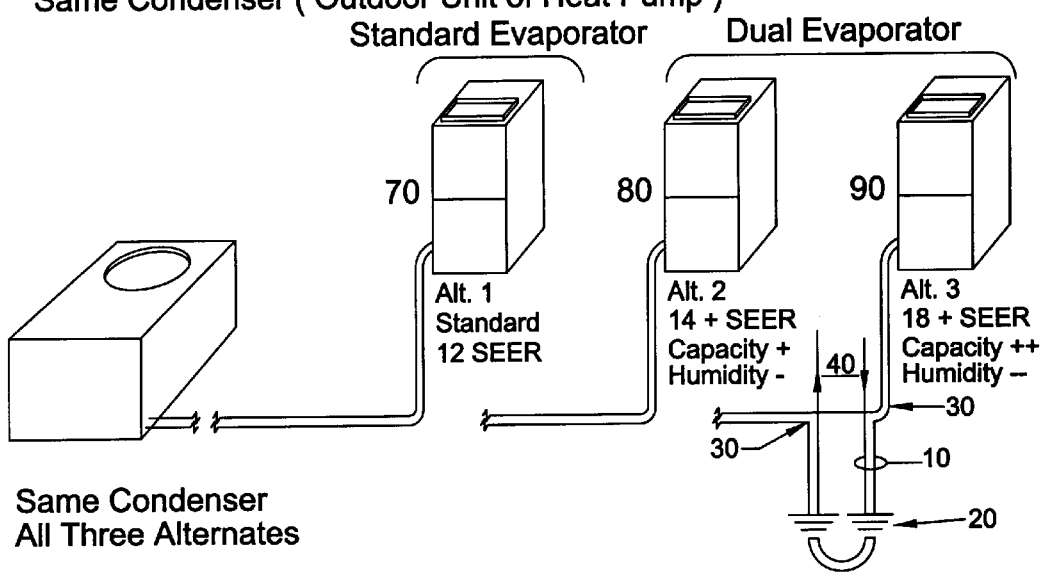
FIGS. 7 and 7a are hardware schematics showing the possible combinations of a single condenser with and without the subcooler form of the present invention as well as with and without dual evaporator technology and the resulting effects on efficiency of either air conditioning or refrigeration equipment.
Figure 7A:
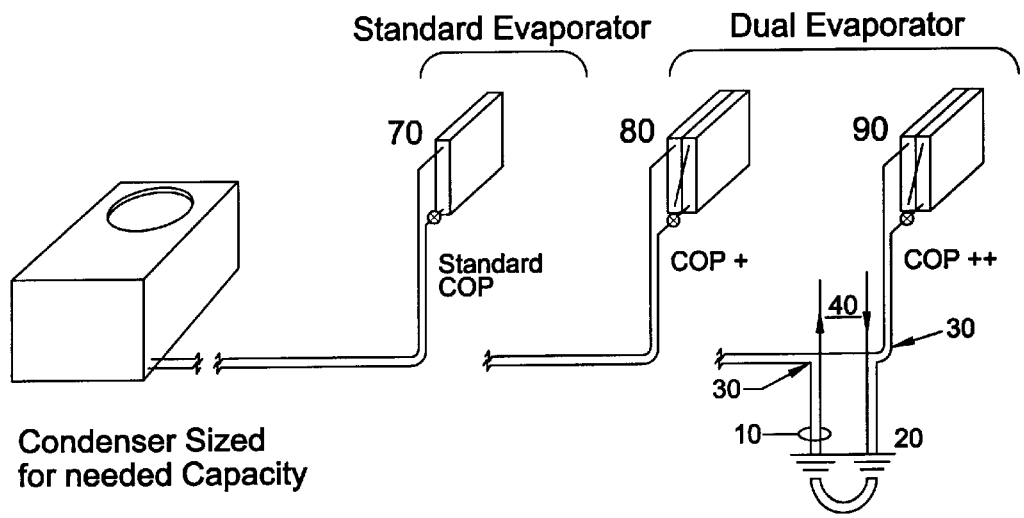

FIGS. 7 and 7a are illustrative of the combinations of the air conditioning or refrigeration equipment possible where the subcooler only form of the new invention could be utilized. A 12 SEER condenser could be coupled with a standard evaporator for 12 SEER operation (70). The same 12 SEER condenser could be coupled with a dual (or multi) sectional evaporator for a 14+SEER operation (80) and finally that same 12 SEER condenser could be coupled with that same dual (or multi) sectional evaporator and the geothermal direct heat exchanger plus secondary fluid subcooler for 18+SEER operation (90). The same condenser can be operated at 3 different levels of efficiency.

Figure 7B:
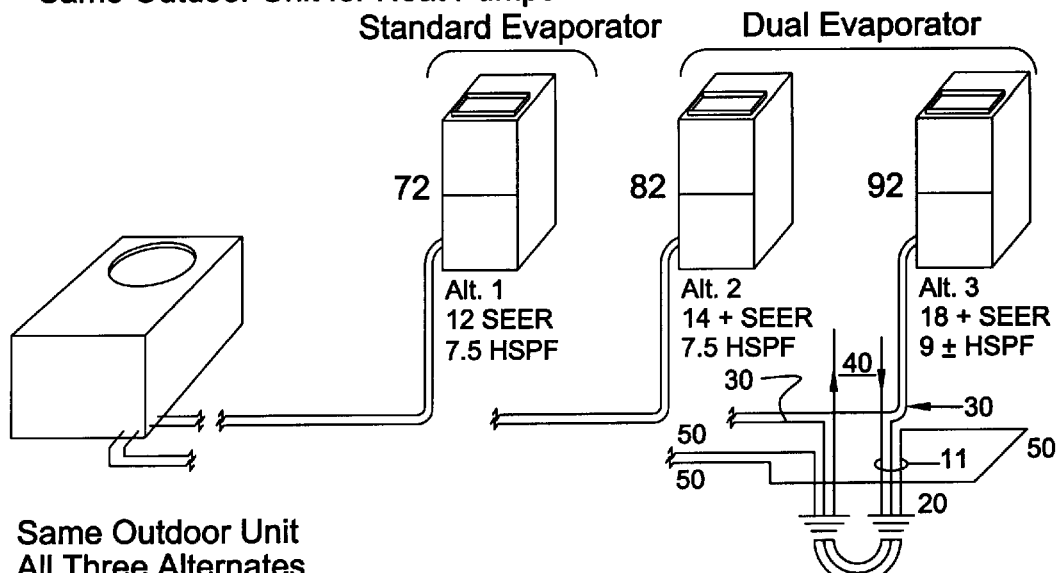
FIG. 7b is a hardware schematic showing the possible combinations of a single outdoor unit (of a heat pump) with and without the subcooler/postheater form of the present invention as well as with and without dual evaporator technology and the resulting effects on the efficiencies in either the cooling or heating modes of the heat pump.

FIG. 7b is illustrative of the combination of heat pump equipment possible where the subcooler and subcooler/postheater form of the new invention could be utilized. A 12 SEER-7.5 HSPF outdoor section coupled with a standard indoor coil for standard 12 SEER-7.5 HSPF operation (72). The same 12 SEER-7.5 HSPF outdoor section coupled with a dual (or multi) sectional indoor coil could operate at a 14+SEER-7.5 HSPF (82) and that same 12 SEER-7.5 HSPF outdoor section coupled with a dual (or multi) sectional indoor coil and the geothermal direct heat exchanger plus liquid refrigerant heat reclaim postheater and/or subcooler coupled with secondary fluid heat exchange will operate at an 18+SEER and a 9+HSPF (92).

Figure 7C:
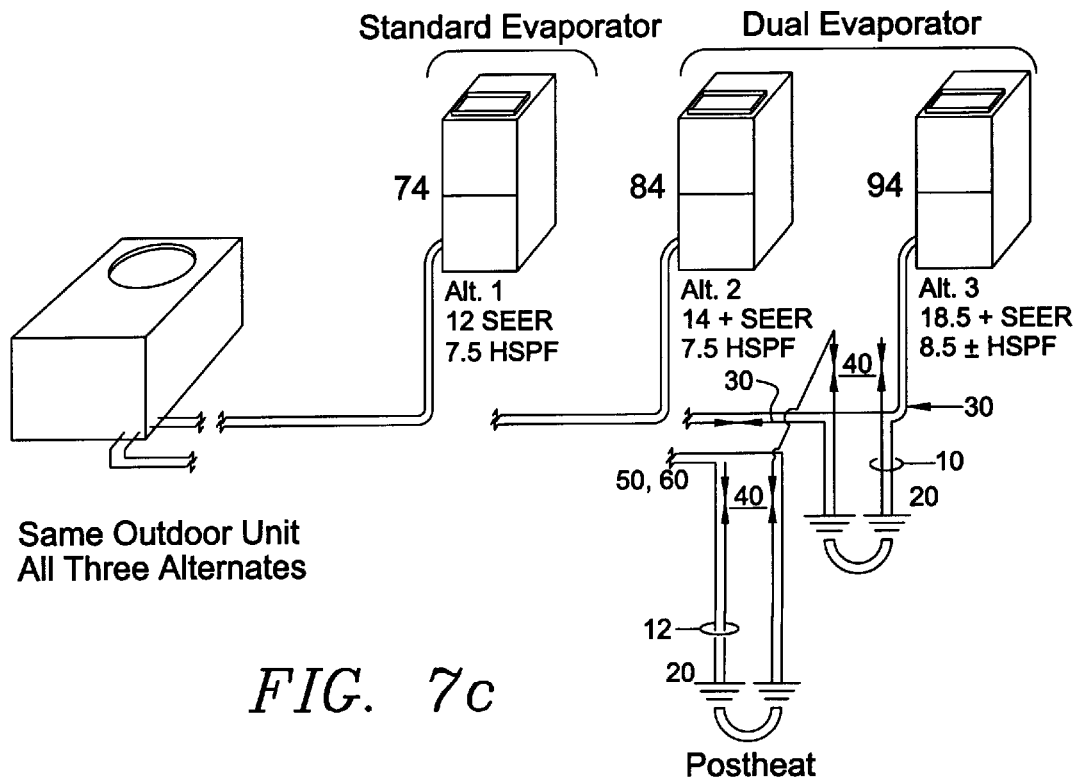
FIG. 7c is a hardware schematic showing the possible combinations of a single outdoor unit (of a heat pump) with and without the subcooler plus precooler/postheater form of the present invention as well as with and without dual evaporator technology and the resulting effects on the efficiencies in either the cooling or heating modes of the heat pump.

FIG. 7c is illustrative of the combinations of the air conditioning or refrigeration condensers possible where both the subcooler and precooler forms of the new invention could be utilized. For example; a 12 SEER condenser could be coupled with a standard evaporator for 12 SEER operation (74). The same 12 SEER condenser could be coupled with a dual (or multi) sectional evaporator for a 14+SEER operation (84) and finally that same 12 SEER condenser could be coupled with that same dual (or multi) sectional evaporator and both the subcooler and precooler forms of the present invention for 19+SEER operation (94). The same condenser can be operated at 3 different levels of efficiency.

Figure 7D:
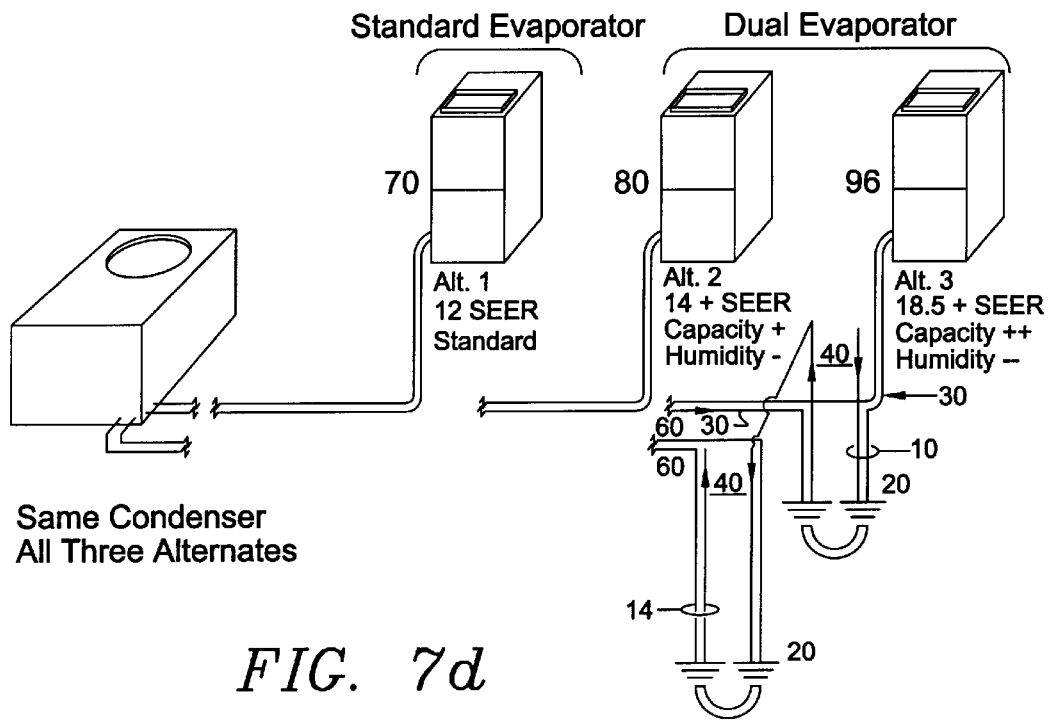
FIGS. 7d and 7e are hardware schematics showing the possible combinations of a single outdoor condenser for an air conditioner or refrigeration system with and without the subcooler plus precooler form of the present invention as well as with and without dual evaporator technology and the resulting effect on efficiencies.
Figure 7E:
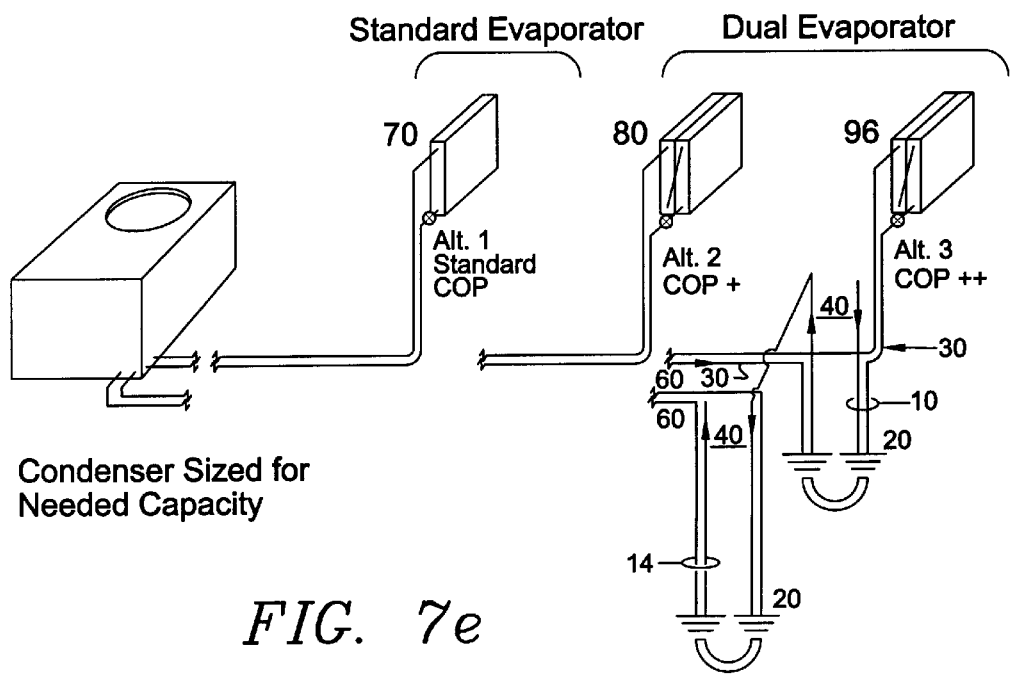

FIGS. 7d and 7e are illustrative of the combinations of air conditioning or refrigeration equipment possible where the subcooler and the precooler forms of the new invention could be utilized. A 12 SEER condenser could be coupled with a standard evaporator (70) or with a dual evaporator (80) as described for FIGS. 7 and 7a. The same 12 SEER condenser (or standard refrigeration condenser) coupled with a dual (or multi) sectional evaporator and the subcooler plus precooler forms of the present invention for 18.5+SEER operation or increased COP operation for the refrigeration condenser (96).

The increase in efficiency due to subcooling is well known and is due to the increase in capacity due to subcooling of the liquid refrigerant. What is unique in this invention is the low cost use of direct geothermal heat exchange to provide economical subcooling. Where geothermal subcooling is limited or inadequate, the use of a secondary fluid for subcooling can be provided through a secondary heat exchanger as illustrated in FIGS. 2, 2a and 2b.

The increased efficiency in the heating mode of a heat pump is due to extra heat being provided to the evaporator section of the refrigeration cycle. The heat provided comes from heat reclaim of the heat in the liquid refrigerant, supplementary heat provided from a geothermal source, and if needed, heat provided from a secondary fluid. The extra heat provides for more mass flow through the system and a greater change in enthalpy and thereby a greater amount of heat rejected by the condenser. The removal of heat from the liquid refrigerant prior to the expansion device and evaporator as reclaim to the evaporator provides for more heat removal from the primary heat source because of the reduction of flash gas loss and more heat being absorbed by the refrigerant, at the start of the evaporator section.

The increased efficiency of the refrigeration cycle due to precooling is due to lower head pressure, higher compressor efficiency and more efficient use of the primary condenser.

The geothermal subcooling and/or precooling, and/or the precool/postheat addition are especially cost effective, because they can be added economically to any air cooled or water cooled condenser even after initial installation of the primary equipment.

The liquid refrigerant heat reclaim, supplementary geothermal heat, and/or supplementary secondary fluid heat provision to the evaporator of a heat pump would be less economical but still cost effective.

The present disclosure includes that contained in the appended claims, as well as that of the foregoing description. Although this invention has been described in its preferred form with a certain degree of particularity, it could be understood that the present disclosure of the preferred form has been made only by way of example and that numerous changes in the details of construction and the combination and arrangement of parts may be resorted to without departing from the spirit and scope of the invention.

now that the invention has been described, what is claimed is:

1. A direct geothermal heat exchange refrigerant subcool system comprising in combination:
  a) a subcooler connected in fluid communication with an output of a condenser of an air conditioner, refrigeration unit, or heat pump enabling a refrigerant to flow through said subcooler;
  b) a secondary fluid refrigerant subcool system for subcooling the refrigerant that had previously passed through the condenser including at least one secondary tube thermally connected to a tube carrying the liquid refrigerant;
  c) said subcooler and secondary thermally connected tubes being buried in the ground for direct geothermal heat exchange between the refrigerant and the earth; and d) means for controlling the rate of flow of fluid through said secondary tube for purposes of additional auxiliary sub-cooling or for purposes of preventing geothermal saturation, to provide the maximum available subcooling of the liquid refrigerant.

2. A direct geothermal heat exchange refrigerant postheat and subcool system for postheating a refrigerant that had previously passed through an evaporator of a heat pump unit operating in the heating mode, while simultaneously subcooling a refrigerant that had previously passed through a condenser of that same heat pump unit, comprising in combination:

a) a postheater/subcooler combination including a postheater tube thermally connected to a subcooler tube, said postheater connected in serial communication with an output of the evaporator enabling the refrigerant to flow through said postheater after first flowing through the evaporator, and the subcooler connected in serial communication with an output of the condenser enabling the refrigerant to flow through said subcooler; and b) said postheater/subcooler combination being buried in the ground for direct geothermal heat exchange between the refrigerant in the postheater and the refrigerant in the subcooler, thereby providing maximum heat available to the postheater from both the ground and the liquid refrigerant and providing the maximum subcooling possible to the liquid refrigerant.

3. A direct geothermal heat exchange refrigerant postheat, subcool plus at least one secondary fluid postheat, subcool system for postheating a refrigerant that has already passed through an evaporator of a heat pump unit operating in the heating mode, while simultaneously subcooling a refrigerant that had previously passed through a condenser of that same heat pump unit, comprising in combination:

a) a postheater/subcooler combination including a postheater tube thermally connected to a subcooler tube and to at least one secondary fluid tube in which the postheater is in serial communication with an output of the evaporator enabling the refrigerant to flow through said postheater after first flowing through the evaporator, the subcooler being in serial communication with an output of the condenser, enabling the refrigerant to flow through said subcooler;

b) said postheater/subcooler combination and secondary thermally connected tubes being buried in the ground for direct geothermal heat exchange between the refrigerant in the postheater and the refrigerant in the subcooler and the earth; and c) means for controlling the rate of flow of fluid through said secondary tubes for purposes of additional postheating and subcooling or for purposes of preventing geothermal saturation, thereby providing the maximum heat possible to the postheater and the maximum subcooling possible to the liquid refrigerant.

4. A direct geothermal heat exchange refrigerant postheat or precool system, comprising in combination:

a) a postheater/precooler connected in serial communication between a reversing valve of the heat pump unit and an outdoor air source coil of an air source heat pump or water source coil of a water source heat pump;

b) a secondary fluid postheat or precool system for postheating a refrigerant that had previously passed through an evaporator of a heat pump unit operating in the heating mode or for precooling the hot gas refrigerant before it passes into the condenser of a heat pump unit operating in the cooling mode including at least one secondary tube thermally connected to the tube carrying the refrigerant;

c) said postheater/precooler combination and secondary thermally connected tubes being buried in the ground for direct geothermal heat exchange between the refrigerant and the earth; and d) means for controlling the rate of flow of fluid through said secondary tube for purposes of additional postheating or precooling or for the purposes of preventing geothermal saturation to provide the maximum amount of postheating or precooling.

5. A direct geothermal heat exchange refrigerant precool system, comprising in combination:

a) a precooler connected in serial communication between an output of a compressor and an input of a condenser of an air conditioning or refrigeration system;

b) a secondary fluid refrigerant precool system for precooling the refrigerant before passing into the condenser including at least one second tube thermally connected to a tube carrying the refrigerant;

c) said precooler and secondary thermally connected tubes being buried in the ground for direct geothermal heat exchange between the refrigerant and the earth; and d) means for controlling the rate of flow of fluid through said secondary tube for purposes of additional precooling or for the purposes of preventing geothermal saturation, to provide the maximum amount of precooling.

* * * * *